United States Patent
Yang (10) Patent No.: US 8,803,810 B2
(45) Date of Patent: Aug. 12, 2014

(54) MULTIPLE USE EDUCATION AND ENTERTAINMENT DEVICE FOR YOUNG USERS

(75) Inventor: Dan Dan Yang, Ottawa (CA)

(73) Assignee: Rullingnet Corporation Limited, Hong Kong (HK)

( * ) Notice: Subject to any disclaimer, the term of this patent is extended or adjusted under 35 U.S.C. 154(b) by 420 days.

(21) Appl. No.: 13/091,354

(22) Filed: Apr. 21, 2011

(65) Prior Publication Data

US 2012/0268390 A1 Oct. 25, 2012

(51) Int. Cl.
*G09G 5/00* (2006.01)

(52) U.S. Cl.
USPC ........ 345/169; 345/156; 345/173; 455/556.1; 455/556.2; 455/566; 362/600

(58) Field of Classification Search
USPC ............ 345/156, 169, 173; 455/556.1, 556.2, 455/566; 362/600
See application file for complete search history.

(56) References Cited

U.S. PATENT DOCUMENTS

| 7,486,279 | B2* | 2/2009 | Wong et al. | 345/173 |
| 8,391,921 | B2* | 3/2013 | Moran et al. | 455/556.1 |
| 2004/0196265 | A1* | 10/2004 | Nohr | 345/169 |
| 2006/0173980 | A1* | 8/2006 | Kobayashi et al. | 709/222 |
| 2012/0062475 | A1* | 3/2012 | Locker et al. | 345/173 |

\* cited by examiner

*Primary Examiner* — Jennifer Nguyen
(74) *Attorney, Agent, or Firm* — Brion Raffoul (57) ABSTRACT

A device which has both educational and entertainment purposes. The device has a housing which allows multiple instances of the device to be stacked together. The device has a CPU, memory, storage, and a wireless module which allows communications with a base computer. The device also has a flat touch screen which serves as the user interface. The touch screen also serves as the video display for the device. Each device is approximately the size of a conventional building block. Variants include having some sides equipped with protuberance and some sides are equipped with voids. The protuberances of one device is constructed and arranged to interlockingly mate with the voids of another device. The device may be used in conjunction with multiple types of applications which have both educational and entertainment uses. The device may be used to receive images, data, commands, etc. from the base computer and the device may be used in conjunction with other similar devices.

18 Claims, 5 Drawing Sheets

MULTIPLE USE EDUCATION AND ENTERTAINMENT DEVICE FOR YOUNG USERS

TECHNICAL FIELD

The present invention relates to devices for educational and entertainment purposes. More specifically, the present invention relates to a small computing device with a flat touch screen interface and which is capable of networking with a base computer and with other similar devices.

BACKGROUND OF THE INVENTION

The need for educational and entertainment for younger children has been around since time immemorial. Stackable blocks have been around for at least a century and are well-known toys for young children. To make them more educational and more attractive to children, some blocks have been designed with letters, numbers, or pictures on their various sides. Blocks, however, while stackable and rugged, tend to be static with a fairly limited number of uses. That being said, it should be noted that blocks provide both education and entertainment to children as they can be used to exercise children's motor skills, teach children about balance, and other concepts including numbers, images, and letters.

Another well-known children's toy is the jigsaw puzzle. Children have been fascinated and entertained by this toy since the 1800s. However, once a particular puzzle has been solved, children tend to lose interest in it, sometimes forcing parents to continuously purchase more and more puzzles. Similar to blocks, jigsaw puzzles can be used for both education and entertainment as they can be used to teach children about a variety of subjects.

From the above, it can be seen that at least two well-known children's toys have both educational and entertainment uses. However, the technological advances in the past decade have not been applied to these or other educational and entertainment classics of old.

It should be noted that computer games and video games have attempted to bring the traditional children's toys into the 21st century. Video games exist which allow young children to interact with virtual jigsaw puzzles or virtual blocks. However, these attempts do not provide the same tactile experience that analog or "real" jigsaw puzzles or "real" blocks provide to young children. The interactions that children have with these video games are done by using a mouse, a keyboard or any number of traditional user interfaces. At a young age, children learn best when they are physically manipulating items and when they are accomplishing and doing things with physical toys/items. Regular computer games do not offer such opportunities for such physical manipulation.

Another problem with computer games, especially those on smartphones and tablet PCs is that these games tend to isolate the user. A social play or playing in a social environment, with all the social interaction that this entails, is lacking with such video games. Social development is one of the most important aspects of a child's upbringing. Handheld mobile devices tend to decrease opportunities for social play (or play with others in a physical, social environment) as these mobile devices are designed for single, individual play.

It is therefore an object of the invention to provide solutions which may mitigate if not overcome the shortcomings of the prior art.

SUMMARY OF INVENTION

The present invention provides a device which has both educational and entertainment purposes. The device has a housing which allows multiple instances of the device to be stacked together. The device has a CPU, memory, storage, and a wireless module which allows communications with a base computer or peer device. The device also has a flat touch screen which serves as the user interface. The touch screen also serves as the video display for the device. Each device is approximately the size of a conventional building block. Variants include having some sides equipped with protuberance and some sides are equipped with voids. The protuberances of one device is constructed and arranged to interlockingly or nestingly mate with the voids of another device. The device may be used in conjunction with multiple types of applications which have both educational and entertainment uses. The device may be used to receive images, data, commands, etc. from the base computer and the device may be used in conjunction with other similar devices.

In a first aspect, the present invention provides a device for educational and entertainment use, the device comprising:
  a data processor
  data storage coupled to said data processor
  a wireless networking module for communicating with a base computer, said wireless networking module being coupled to said data processor
  a flat touch screen user interface for receiving user input, said touch screen being coupled to said data processor
  a housing for containing said data processor, data storage, and said wireless networking module, said housing being constructed and arranged such that said device is stackable with other similar devices, said housing having a plurality of sides
wherein
said flat touch screen forming a touch screen side of said plurality of sides of said housing
said housing is stackable with other similar devices using non-touch screen sides of said plurality of sides In a second aspect, the present invention provides a system for educational or entertainment uses, the system comprising:
  a wireless module for a base computer,
  at least one device comprising:
    a data processor
    data storage coupled to said data processor
    a wireless networking module for communicating with said base computer through said wireless module, said wireless networking module being coupled to said data processor
    a flat touch screen user interface for receiving user input, said touch screen being coupled to said data processor
    a housing for containing said data processor, data storage, and said wireless networking module, said housing being constructed and arranged such that said device is stackable with other similar devices, said housing having a plurality of sides
  wherein for each of said device,
  said flat touch screen forms a touch screen side of said plurality of sides of said housing
  said housing is stackable with other similar devices using non-touch screen sides of said plurality of sides.

BRIEF DESCRIPTION OF THE DRAWINGS

The drawings show features and advantages will become more apparent from a detailed consideration of the invention when taken in conjunction with the drawings in which.

DETAILED DESCRIPTION OF THE INVENTION

Figure 1:
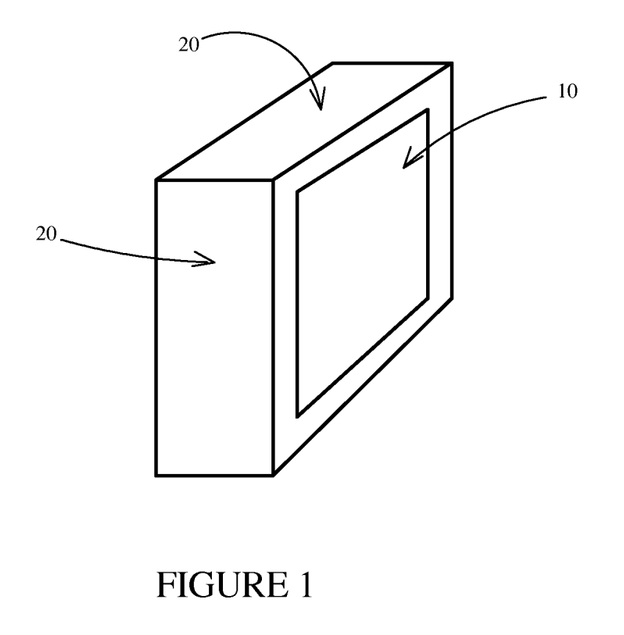
FIG. 1 is a front elevation view of one implementation of the invention.

Referring to FIG. 1, a view of one possible implementation of the invention is illustrated. As can be seen, the device in this implementation has a square front cross-section and a rectangular side cross-section. A touch screen 10 on the front of the device has a dual purpose as it provides video output for the device as well as providing a user input interface. The touch screen 10 is flat as are the other four sides of the device's housing 20 adjacent to the touch screen. The side opposite to the touch screen, the back of the device, may also be flat to facilitate placing the device flat on a surface with the touch screen facing the user. This, however, is not necessary as a non-flat back side of the device is also acceptable. The sides of the device adjacent to the touch screen are also flat to facilitate stacking the device with other instances of the device.

Figure 2:
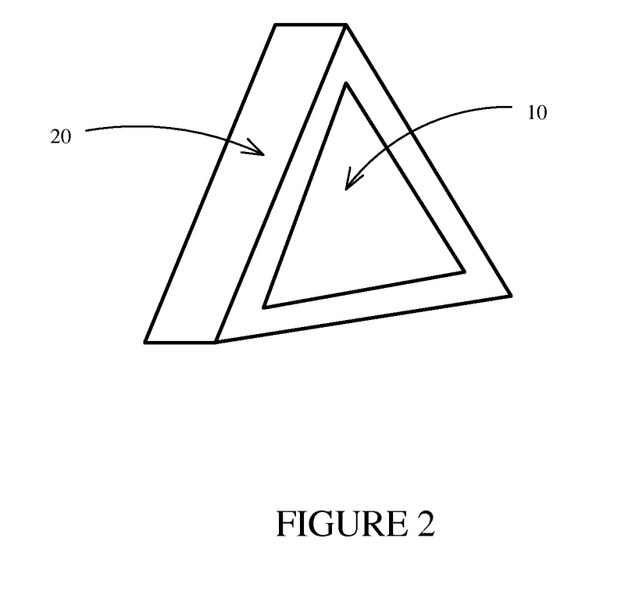
FIG. 2 is a front elevation view of one variant of the invention.

A variant of the housing 20 is illustrated in FIG. 2. As can be seen, the housing in FIG. 2 is has a front triangular cross-section but still a rectangular side cross section with 3 flat sides adjacent to the touch screen side. The variant in FIG. 2 also has a flat touch screen 10 similar to the device in FIG. 1. It should be noted that other variants with different front cross-section shapes are possible. As examples, five, six, seven, or even eight sided front cross-sectional shapes are possible.

Figure 3A:
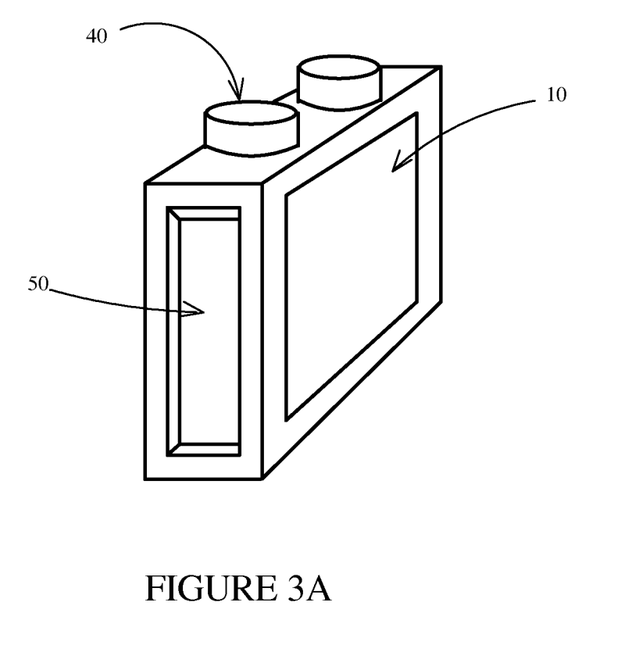
FIGS. 3A and 3B are elevation views of another variant of the invention.
Figure 3B:
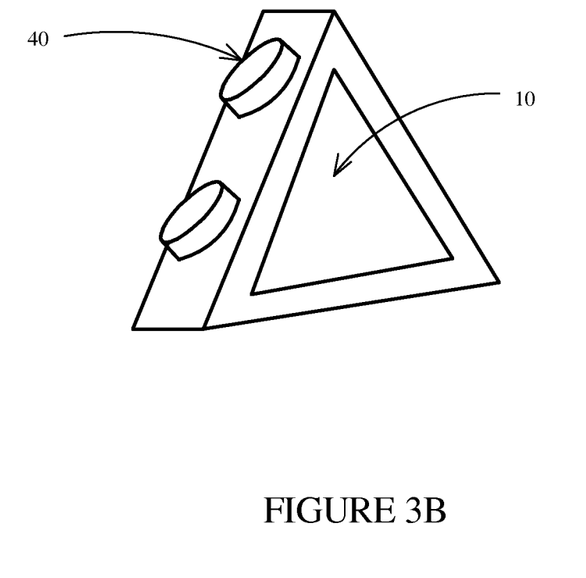

A further variant of the housing 20 is illustrated in FIGS. 3A and 3B. The sides 30 adjacent to the touch screen 10 are equipped with either protuberances 40 or voids 50. The protuberances 40 are designed and dimensioned to interlock (when aligned) with voids 50 on similar devices. Thus, not only can multiple instances of the device be stackable, they can be physically coupled to one another. These voids and protuberances can, in another implementation, also nestingly match each other. In the variant illustrated in FIGS. 3A and 3B, the protuberances 40 are circular and the voids are channels with walls spaced to ensure a tight fit with corresponding protuberances on other instances of the device. Of course, other configurations of the protuberances and the voids may be used.

Figure 4:
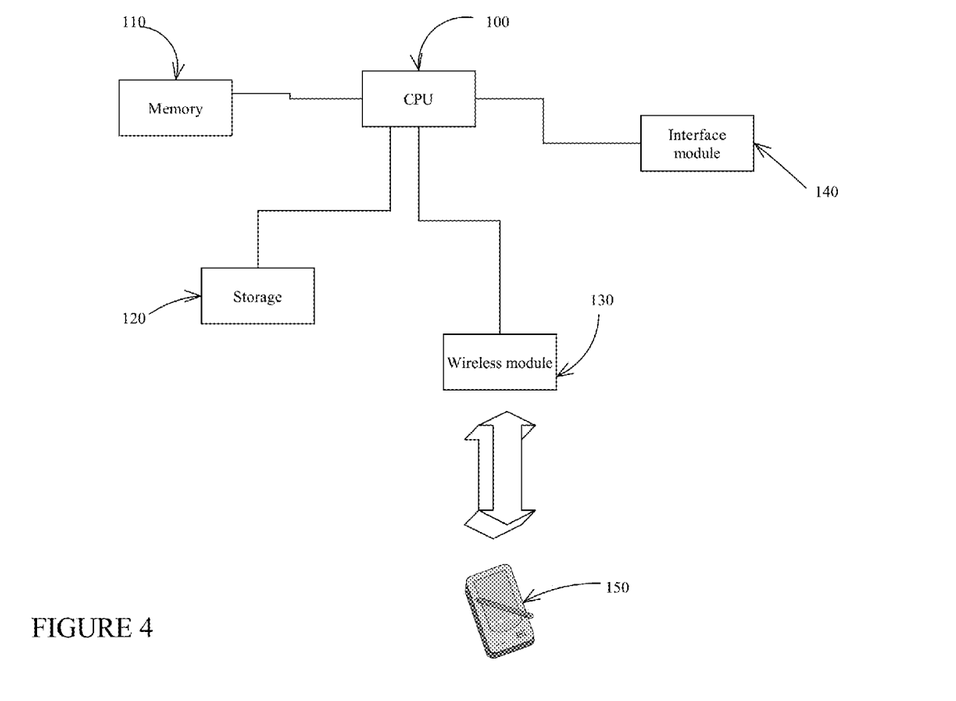
FIG. 4 is a block diagram of the components of one implementation of the invention.

Regarding the internal components of the device, FIG. 4 illustrates a block diagram of these components. A CPU (central processing unit) 100 is coupled to a memory 110, a storage 120, a wireless module 130, and an input module 140. The input module 140 receives data from the touch screen user interface and communicates this to the CPU. The memory 110 provides temporary storage space for applications and programs currently running while storage 120 stores data and code which may be needed by the CPU. The wireless module 130 provides a wireless communications link between the device and a base computer 150. The device may be powered by a battery.

Any suitable CPU may be used. Thus, the CPU may be one of a variety of data processing units with a suitable form factor and suitable processing power. Low power CPUs may be more suitable for the device as low power consumption is desired. The memory 110 may be any suitable random access memory that works with the CPU. Storage 120 may be Flash memory or any non-volatile storage suitable to work with the CPU.

The touch screen interface may be a capacitive or a resistive touch screen which is well known to those skilled in the art. Depending on the implementation, the touch screen interface may be multi-touch or multi-gesture capable (i.e. different touch gestures on the touch screen interface denote different actions and cause different effects or commands to be executed). However, a more robust implementation has the touch screen interface providing not just touching or tapping as inputs but also allows dragging of images on the touch screen from one part of the screen to another. The use of a touch screen interface on the device allows for more varied range of interactions between the user and the device. As well, the use of a touch screen interface allows for a greater number of applications for the device, especially when the device is used with a base computer. As an example, the device can function as an input device to the base computer—the inputs to the base computer are not limited to a simple click of a switch but can include swipes, drags, taps, and touches on the touch screen interface. The touch screen interface therefore provides a two-way communication between the user and the base computer. The base computer can send images to the device and the user can interact with the images (using the touch screen interface) and the interaction can be communicated back to the base computer. Based on what the interaction is, the application executing on the base computer can react or function accordingly.

The wireless module 130 can receive data and applications from the base computer. Depending on the application running on the base computer, the base computer can send applications, images, and other data to the device. The device may also send data to the base computer by way of the wireless module. The device may send data inputted by a user by way of the touch screen to the base computer. As an example, if multiple options are provided to the device user by way of the touch screen interface, the device user may then select one of the options by touching a specific part of the touch screen interface. This selection may then be sent by the device to the base computer. The wireless module may use any one of multiple technologies to communicate with the base computer. Thus, the wireless module may be Wi-Fi, Bluetooth, or radio transceiver capable. In one implementation of the invention, the device may be configured as a slave in a master-slave network configuration with the base computer operating as the master. Similarly, the base computer can operate as a wireless networking hotspot with various instances of the device operating as peers and/or slaves in a local area network. To differentiate one device from another, each device may be configured with a unique address so that the base computer can differentiate one device from another. This will allow the base computer to send data and/or instructions to specific devices without having to ensure that other devices are interfered with.

Figure 5:
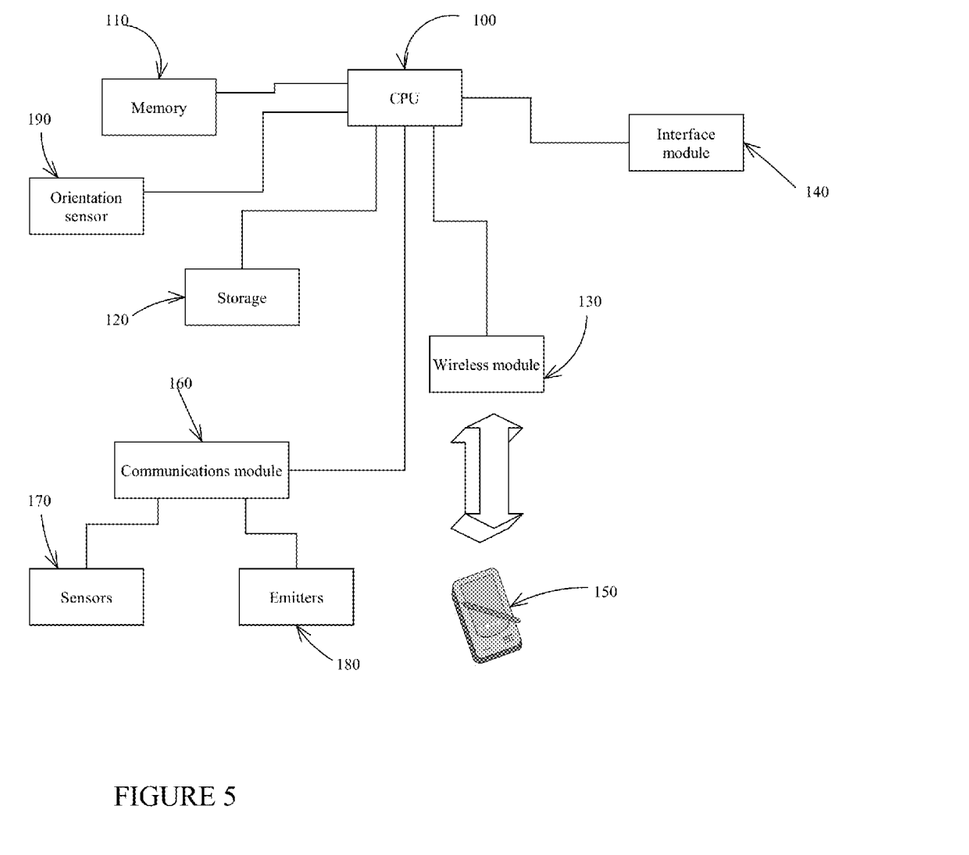
FIG. 5 is block diagram of one variant of the invention including a communications module.

In one variant, illustrated in FIG. 5, the internal components of the device may include a communications module 160 that also communicates with the CPU. The communications module 160 communicates with other similar devices in a wireless manner. As such, the communications module may be coupled to sensors 170 and emitters 180 that are located on the non-touch screen sides of the device. The sensors and emitters are able to send and receive data wirelessly from other instances of the device. This way, one device can sense and/or send data to other devices. The emitters 180 would send out signals that can be picked up by other instances of the device while the sensors 170 can receive data sent out by emitters of the other instances of the device. These sensors and emitters are of a short-range variety so that signals can be received or transmitted over relatively short ranges (perhaps a few inches). The sensors and emitters, when they sense a similar device next to the device, can alert the data processor. If the program executing allows for this, the data processor is alerted and the device may be made to function differently or commands/alerts may be sent to the base computer. A further variant allows data transfer between different devices using the sensors and emitters. However, a more robust method for transferring data between blocks may be accomplished by having one device communicate and transfer data with other instances of the device by way of the base computer. Thus, device A can transfer data to the base computer using the wireless module and this data can then be forwarded by the base computer to device B.

A further variant of the device uses an orientation sensor 190 that determines the orientation of the device. The orientation sensor 190 may take the form of a multi-axis accelerometer that determines when the device is rotated. Upon detection of a rotation, the device's CPU rotates the image on the touch screen interface accordingly.

It should be noted that the present device is targeted for use by young children. To facilitate this, the housing for the device is preferably approximately 3 inches square (with about a 3 inch sized touch screen interface) and about 1-2 inches thick so that young children may be able to properly handle the device. As well, these dimension limits would facilitate the stacking of multiple instances of the device by young users. Of course, the device may be smaller than the above dimensions. In one implementation, the device may be as small as about 1 inch cubed in size.

It should be noted that the device is, preferably, powered by an internal, rechargeable battery. A USB port (not pictured) may be used to recharge the internal battery. In another implementation, a docking station may be used to recharge the internal battery. A docking station which can accommodate multiple instances of the device may also be used to charge the internal batteries of the devices docked. It should be noted that such a docking station may use a USB port for recharging or may use a wireless recharging method (e.g. inductive charging).

The software operating on the device would be suitable for such a small form factor. The operating system provides access to multiple applications stored on the storage 120. A number of these applications involve displaying at least one image on the touch screen interface and having the user interact with the application by way of the touch screen interface. The base computer may or may not be involved. In some applications, the base computer sends data to the device and this data determines which images are shown on the touch screen interface. In other applications, the device is a stand-alone device with the user interacting with the device's application by way of the touch screen interface.

Other variants of the present device and its uses utilize the device as an adjunct to the base computer. For these variants, the device receives data from the base computer and the user of the device interacts with the application running on the base computer by way of the touch screen interface. The device can therefore act as a possible video output for the base computer and as an input device (used by the device user) for the application running on the base computer. As can be imagined, the communication with the base computer is accomplished through the wireless module with the wireless module being used as a two-way communications coupling with the base computer. One variant of the present invention has the device configured as a secondary monitor/video output device for the base computer. For this variant, the only processing of note on the device is that required to display a video output, such as 2D or 3D images, on the touch screen interface. User inputs by way of the touch screen interface are all forwarded to the base computer. All processing of note are thus accomplished on the base computer.

The base computer may be any suitable PC or tablet machine that is capable of communicating with the device or multiple instances of the device. Any suitable personal computer may be reconfigured to communicate with the device by way of a suitable dongle or removably attachable wireless module which is able to act as a communications bridge between the personal computer (as a base computer) and the device (or multiple instances of the device). As noted above, the removably attachable wireless module which would be plugged into the base station may use the wireless Wi-Fi standard, the Bluetooth standard, or may use some other radio based wireless communications standard.

Figure 6:
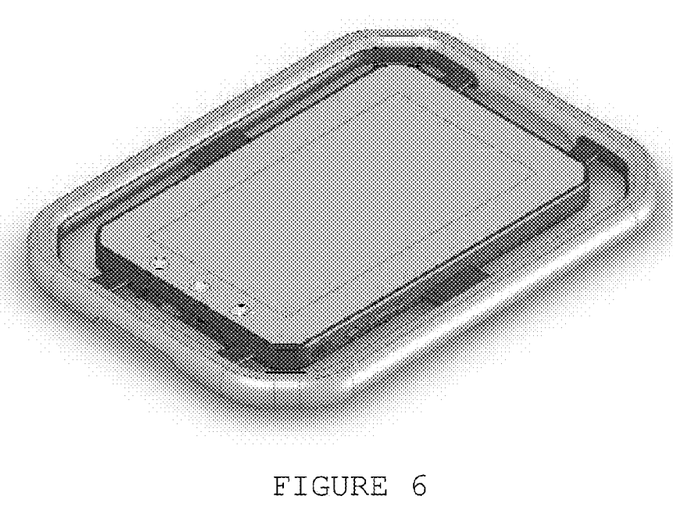
FIG. 6 is an illustration of a tablet PC which may be used as a base station for use with one aspect of the invention.

From the above, any personal computer can operate as a base computer as long as suitable software for controlling/communicating with the device is used. However, for applications involving young children and for applications which may be used in a classroom, a tablet PC would be ideal. A tablet PC is illustrated in FIG. 6. The tablet PC would be portable, easy to use for a parent or teacher, and can be easily used with the device or multiple instances of the device as either part of a play system or an educational system.

As noted above, the device is designed for use by younger children. As such, it is preferable that the device be hardened or made durable to withstand their use by younger children. The housing may be made of thick, durable plastic which can withstand being thrown against hard surfaces or dropped from some heights. Also, it is preferably that the device be made water resistant as younger children may submerge the device in liquid, may chew on the device (and hence cover it in saliva), or may otherwise expose the device to fluids or liquids. The front of the device, with the touch screen interface, may be made of hardened glass (preferably scratch resistant) to, again, withstand use and abuse by younger users.

Multiple applications may be used with the device. These applications may involve displaying images on the touch screen interface and having the user select the proper image by scrolling through the possible images using the touch screen interface. Other applications may involve the user interacting directly with the base computer using the touch screen interface of the device as the input device for the base computer. Similarly, other applications may involve multiple instances of the device being networked with and interacting with one another and with the base computer. These applications may have different instances of the device displaying different images, either from its own storage or being sent to it by the base computer. Some of these applications may involve multiple users using multiple, different instances of the device with the base computer either controlling what is shown on the various instances of the device or what options are available on the various instances of the device for the different users. Other applications may have the base computer determining which of the multiple instances of the device are adjacent to one another and, based on this, different images/options may be displayed on the instances of the device. This can be accomplished using the variant of the device equipped with the sensors and emitters noted above. Each device can thus determine which similar devices are adjacent and, by reporting to the base computer, the base computer can determine how to configure each device or how an application running on the base computer will react or function.

While many applications are possible with the present invention, some of these applications are as follows:

Entertainment Applications:
Puzzle
- each instance of the device will show one piece of the puzzle and, in one variant, the user can rotate through different pieces of the puzzle by way of the touch screen interface)
- multiple puzzles can be sent from the base station to multiple instances (or a set) of the device so that a user can have multiple puzzles (including the jigsaw variety) available using only one set or multiple instances of the device Image/letter/number identification
- an image, letter, or number can be displayed on the touch screen interface and the user can input a selection (whether it is a correct image/letter/number) through the touch screen interface Image matching
- a user scrolls through a number of images on the touch screen interface and selects one that is either also displayed on the touch screen interface or is displayed on the base computer
- if used with multiple instances of the device, the user scrolls through the different images on each device to complete a set (multiple images that have something in common or all images being the same)

Educational Applications:
Flash cards (for numbers or letters)
- the base station (used by a parent or teacher) sends letters or numbers to the device and the user selects a correct answer based on what the base station is looking for (e.g. the user has to identify all letters or all numbers)

Image Completion
- multiple instances of the device are used with each instance showing a portion of a larger image. The user selects an image on one of the devices which completes the larger image. The larger image may or may not be completed by placing the different instances of the device in the proper order/sequence.

Arithmetic based applications
- multiple instances of the device can be used with at least one device displaying an arithmetic equation and at least one device displaying an equal sign. The images on the other devices can then be changed (through the touch screen interface) to different numbers. The different devices can then be arranged to display different equations and, if the equation is correct, the user is rewarded.

Group Applications (for Use with Multiple Devices and Multiple Users):
Flash cards
- the base computer (used by a parent or a teacher) sends different images, letters, numbers to different devices in the hands of different users. Depending on which images are sent to the different devices, the users, working with each other, can then form words, equations, or larger images. Also, the different users can identify what is displayed on their device.

Spelling
- different images of different letters are displayed on multiple instances of the device using the base computer (used by a parent or teacher). The users can, by working with each other, spell different words requested by the parent or teacher.

Image completion
- multiple instances of the device each display different parts of a larger image. Different users, by working with each other, can organize and order the different instances of the device to recreate the larger image.

In one application, multiple instances of the device may be used in a collaborative environment with (or without) supervision by a parent or teacher. Multiple instances of the device may be configured so that each device displays a part of a larger screen or a larger image. Two or more younger users can then collaborate to form the larger image by properly arranging and rearranging the devices so that their touch screen interfaces form the larger image.

Another implementation of the above would make use of the base computer as a controller for multiple instances of the device. The base computer, controlled by a teacher or a parent, can send different parts of a larger image to the various instances of the device. Or, the base computer can send different images (perhaps relating to a story or having a common theme) to the various instances of the device. Multiple children can then collaborate, in a social environment, to form the larger image. Alternatively, if the different images relate to a common theme, the different users can collaborate to properly order the different instances of the device according to the different images. As an example, the different images may relate to a story about siblings who go off on a picnic. By properly ordering the various instances of the device, the users can then put together the story. It should be noted that the different instances of the device need not be limited to being used by only one or two young users. Multiple young users may use the device per the discussion above. The devices can be configured so that, as an example, each young user (from a group of, for example, 4) is given 3 instances of the device with different images (e.g. each user is given 3 devices, each device illustrating a different animal). Each user can therefore match his or her image displayed on the device with those of the other users. Two or three matched images can form a larger image. Applications such as the above can be used to teach and foster group interactions with young children.

The device may be part of a kit of multiple instances of the device, with the kit including a wireless pluggable module for controlling the different instances of the device. The kit may also include a docking station for use as a charging device.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g."C") or an object oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A device for educational and entertainment use, the device comprising:
    a data processor;
    data storage coupled to said data processor;
    a wireless networking module for communicating with a base computer, said wireless networking module being coupled to said data processor;
    a flat touch screen user interface for receiving user input, said touch screen being coupled to said data processor;
    a housing for containing said data processor, data storage, and said wireless networking module, said housing being constructed and arranged such that said device is stackable with other instances of said device, said housing having a plurality of sides;
    wherein
    said flat touch screen forming a touch screen side of said plurality of sides of said housing; and
    said housing is vertically stackable with other instances of said device using non-touch screen sides of said plurality of sides;
    said device is for use by children;
    said device is hardened against at least one of: being throwing against hard surfaces, dropped from heights, and exposure to liquids.

2. A device according to claim 1 wherein said housing has at least three non-touch screen sides adjacent said touch screen side.

3. A device according to claim 2 wherein at least one of said non-touch screen sides comprises protuberances which nestingly match voids on housings of other instances of said device.

4. A device according to claim 2 wherein at least one of said non-touch screen sides comprises voids which nestingly match protuberances on housings of other instances of said device.

5. A device according to claim 1 further comprising at least one sensor for sensing at least one other instance of said device adjacent said device, said at least one sensor being adjacent a non-touch screen side of said housing, said at least one sensor being coupled to said data processor such that when at least one other instance of said device is adjacent to said device, said data processor is alerted.

6. A device according to claim 5 wherein said device is provided with a unique address to differentiate said device from similar devices to said base computer.

7. A device according to claim 1 wherein said device receives data from said base computer, said data received from said base computer being related to at least one application being executed on said device.

8. A device according to claim 7 wherein said at least application has educational applications.

9. A device according to claim 7 wherein said at least application has entertainment applications.

10. A device according to claim 1 wherein said device transmits data to said base computer, said data transmitted to said base computer being related to at least one application being executed on said device.

11. A system for educational or entertainment uses, the system comprising:
    a wireless module for a base computer;
    at least one device comprising:
        a data processor;
        data storage coupled to said data processor;
        a wireless networking module for communicating with said base computer through said wireless module, said wireless networking module being coupled to said data processor;
        a flat touch screen user interface for receiving user input, said touch screen being coupled to said data processor; and
        a housing for containing said data processor, data storage, and said wireless networking module, said housing being constructed and arranged such that said device is stackable with other similar devices, said housing having a plurality of sides;
    wherein for each of said device,
        said flat touch screen forms a touch screen side of said plurality of sides of said housing; and
        said housing is vertically stackable with other similar devices having at least one touch screen user interface using non-touch screen sides of said plurality of sides;
        said device is for use by children;
        said device is hardened against at least one of: being throwing against hard surfaces, dropped from heights, and exposure to liquids.

12. A system according to claim 11 wherein input entered through said touch screen interface is communicated to said base computer for interaction with at least one application operating on said base computer.

13. A system according to claim 11 wherein said touch screen interface displays images transmitted from said base computer.

14. A system according to claim 11 wherein said device performs input/output functions for at least one application executing on said base computer.

15. A system according to claim 11 wherein images displayed on said touch screen interface is controlled by said base computer.

16. A system according to claim 11 wherein said wireless module is removably pluggable into said base computer.

17. A system according to claim 11 wherein said base computer is a tablet computer.

18. A system according to claim 11 wherein each one of said device is provided with a unique network address to differentiate said devices.

* * * * *